(12) United States Patent
Snodgrass

(10) Patent No.: US 7,609,753 B1
(45) Date of Patent: Oct. 27, 2009

(54) LINK 16 RADIO RECEIVER USING ANTENNA DIVERSITY

(75) Inventor: Timothy E. Snodgrass, Palo, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 623 days.

(21) Appl. No.: 11/224,810

(22) Filed: Sep. 13, 2005

(51) Int. Cl.
*H04B 1/00* (2006.01)

(52) U.S. Cl. .................................................. 375/147
(58) Field of Classification Search ................. 375/147
See application file for complete search history.

(56) References Cited

U.S. PATENT DOCUMENTS

| | | | | |
|---|---|---|---|---|
| 3,052,882 | A * | 9/1962 | Pidhayny et al. ................ 342/29 |
| 5,247,269 | A * | 9/1993 | Boulouard et al. .............. 333/126 |
| 5,848,361 | A * | 12/1998 | Edwards ..................... 455/562.1 |
| 5,926,503 | A * | 7/1999 | Kelton et al. ................... 375/148 |
| 5,982,327 | A * | 11/1999 | Vook et al. ..................... 342/380 |
| 6,064,338 | A * | 5/2000 | Kobayakawa et al. ........ 342/378 |
| 6,175,327 | B1 * | 1/2001 | Lin et al. .................... 342/357.06 |
| 6,229,840 | B1 * | 5/2001 | Ichihara ......................... 375/147 |
| 6,275,482 | B1 * | 8/2001 | Jevremovic et al. ........... 370/334 |
| 6,618,016 | B1 * | 9/2003 | Hannan et al. ................. 343/705 |
| 6,650,910 | B1 * | 11/2003 | Mazur et al. ................. 455/562.1 |
| 6,779,009 | B1 * | 8/2004 | Zuber ............................. 708/422 |
| 6,819,291 | B1 * | 11/2004 | Lackey et al. ............. 343/700 MS |
| 6,873,834 | B1 * | 3/2005 | Edwards et al. .............. 455/277.1 |
| 6,903,689 | B2 * | 6/2005 | Apostolos et al. ....... 343/700 MS |
| 7,161,974 | B2 * | 1/2007 | Mehrabani et al. ............ 375/148 |
| 7,352,799 | B2 * | 4/2008 | Pajukoski ....................... 375/148 |
| 7,369,832 | B2 * | 5/2008 | Cho ............................. 455/276.1 |
| 2002/0126745 | A1 * | 9/2002 | Prysby et al. .................. 375/148 |
| 2003/0040329 | A1 * | 2/2003 | Yona et al. ..................... 455/507 |
| 2003/0158963 | A1 * | 8/2003 | Sturdy et al. .................. 709/238 |
| 2003/0194996 | A1 * | 10/2003 | Campbell ....................... 455/431 |
| 2004/0081114 | A1 * | 4/2004 | Jiang et al. ..................... 370/320 |
| 2005/0007290 | A1 * | 1/2005 | Aisenbrey ...................... 343/797 |
| 2007/0042725 | A1 * | 2/2007 | Poilasne et al. ................ 455/101 |
| 2007/0071028 | A1 * | 3/2007 | Dorris et al. ................... 370/466 |

OTHER PUBLICATIONS

Cruz, "Netwars Based Study Of a Joint Stars Link-16 Network", USAF, Mar. 9, 2004.*
USAF, "Introduction to Tactical Digital Information Link J And Quick Reference Guide", Jun. 2000.*
Wilson, "Applying layering principles to legacy systems: Link 16 as a case study", Military Communications Conference, 2001, MILCOM 2001. Communications for Network-Centric Operations: Creating the Information Force. IEEE, vol. 1, Oct. 28-31, 2001 pp. 526-531 vol. 1.*
White, "Tactical data links, air traffic management, and software programmable radios", Proceedings. 18th Digital Avionics Systems Conference, 1999, vol. 1/17 pp. vol. 1, Oct. 24-29, 1999 pp. 5.C.5-1-5.C.5-8 vol. 1.*

(Continued)

*Primary Examiner*—Juan A Torres
(74) *Attorney, Agent, or Firm*—Daniel M. Barbieri

(57) ABSTRACT

A Link 16 radio receiving system includes a first antenna, a second antenna, a combiner and a rake receiver. The combiner is coupled to the first antenna and the second antenna. The combiner provides a combined signal. The rake receiver is coupled to the combiner to receive the combined signal.

20 Claims, 3 Drawing Sheets

OTHER PUBLICATIONS

Schenkelberg, "Low cost integrated modular avionics (IMA)", Aerospace and Electronics Conference, 1996. NAECON 1996, Proceedings of the IEEE 1996 National vol. 1, May 20-23, 1996 pp. 48-55 vol. 1.*

Corman, Weapons System Open Architecture—a bridge between "embedded" and "off-board", Aerospace and Electronic Systems Magazine, IEEE vol. 17, Issue 11, Nov. 2002 pp. 21-25.*

Corman, "Weapons system open architecture—using emerging open system architecture standards to enable innovative techniques for time critical target prosecution", Digital Avionics Systems, 2001, DASC, The 20th Conference vol. 2, Oct. 14-18, 2001 pp. 9E4/1-9E4/8 vol. 2.*

Bortnyk, "An improved quad diversity combining technique for effectively combating multipath, antenna gain and shadowing", Military Communications Conference, 2001, MILCOM 2001, Communications for Network-Centric Operations: Creating the Information Force. IEEE, Publication Date: 2001, vol. 1, on pp. 641- 646 vol. 1.*

Lukashuk, "Switching hemispherical antenna array", Jsc Sci. Res. Inst. of Radioengineering, Open Joint Stock Co., Kharkov, Ukraine; This paper appears in: Antenna Theory and Techniques, 2003. 4th International Conference on Publication Date: Sept. 9-12, 2003 vol. 1, on pp. 315-317 vol. 1.*

Kumar, "Hemispherical coverage antenna for spacecraft", Electronics Letters vol. 24, Issue 10, May 12, 1988 pp. 631-633.*

Kim, "DOA estimation utilizing directive elements on a conformal surface", Proceedings of the 2003 IEEE Radar Conference, 2003, May 5-8, 2003 pp. 91-96.*

* cited by examiner

LINK 16 RADIO RECEIVER USING ANTENNA DIVERSITY

FIELD OF THE INVENTION

The present application relates to communication networks. More particularly, the present application relates to a Link 16 receiving system.

BACKGROUND OF THE INVENTION

Link 16 radio systems or terminals typically utilize a Link 16 military waveform (commonly referred to as JTIDS). The Link 16 military waveform is a complex high performance signal-in-space designed specifically to have high anti-jam capability.

The United States government and its military forces often utilize a Link 16 wireless network to communicate data or information among Link 16 terminals. The information can include tactical, positioning, navigational, and other information utilized by military intelligence and other government institutions. Link 16 transmitters and receivers (i.e., terminals) can be mounted on a variety of platforms, including aircraft, naval ships, or even backpack worn by army personnel.

In general, the information in a Link 16 network is transmitted across the airwaves via radio signals (e.g., at frequencies of 969 to 1206 megahertz), which are encrypted on 51 different channels so only users who possess Link 16 terminals can receive the information. The information can be sensitive information, such as, a tactical picture of battlefield conditions, identification of friends and foes, voice communication, or navigational information. The National Security Agency (NSA) tightly regulates the sale and use of terminals or devices capable of operating with a Link 16 network. Generally, the NSA requires that Link 16 terminals be controlled by U.S. forces or very close allies of the United States to protect encryption techniques utilized in Link 16 networks.

Airborne implementations of Link 16 receivers have generally required upper and lower antennas. The upper and lower antennas have required fully redundant receiving capabilities to recover the data on the Link 16 signal. Fully redundant receiving capabilities (fully redundant receivers) is required because it is unknown which antenna has better reception of the signal.

Conventional Link 16 systems utilize dedicated receivers for each antenna. A distinct receiving unit is typically coupled to each antenna. In addition, each receiving unit often includes two receiving circuits. A voting circuit or other logic is required to select the receiving unit that is receiving the strongest signal.

These conventional systems require redundancy, from the analog receiver front end and its filtering completely through the use of digital correlators to determine which antenna is receiving the strongest signal. The use of two receivers or redundant receiving capabilities significantly increases the costs in airborne radio systems because the cost of the receiving hardware is fully double.

Thus, there is a need for a Link 16 system which does not require redundant receiving architecture. Further, there is a need for a low cost Link 16 receiving system for airborne applications. Yet further, there is a need for a low cost Link 16 system which utilized diversity reception to increase performance. Further still, there is a need for a Link 16 which utilizes a signal channel receiver. Further still, there is a need to use multi-path environments in a Link 16 radio system to achieve cost savings and superior performance.

SUMMARY OF THE INVENTION

An exemplary embodiment relates to a Link 16 radio receiving system. The Link 16 radio receiving system includes a first antenna, a second antenna, a combiner and a rake receiver. The combiner is coupled with the first antenna and the second antenna. The combiner provides a combined signal. The rake receiver is coupled to the combiner.

Another exemplary embodiment related to a method of receiving information in a Link 16 system. The method includes providing a first received signal from a first antenna, providing a second received signal from a second antenna, and providing the first received signal and the second received signal in a multi-path environment to a rake receiver. The method also includes recovering the information from the first received signal and the second received signal.

Yet another exemplary embodiment relates to a communication system. The communication system includes a first antenna, a second antenna and Link 16 receiver means. The Link 16 receiver means receives a single signal derived from signals received on the first and second antennas. The Link 16 receiving means correlates a first event associated with a signal received on the first antenna and a second event associated with a signal received on the second antenna.

BRIEF DESCRIPTION OF THE DRAWINGS

Exemplary embodiments of the present invention are described below with reference to the accompanying drawings, wherein like numerals denote like elements, and.

DETAILED DESCRIPTION OF THE PREFERRED EMBODIMENTS

Figure 1:
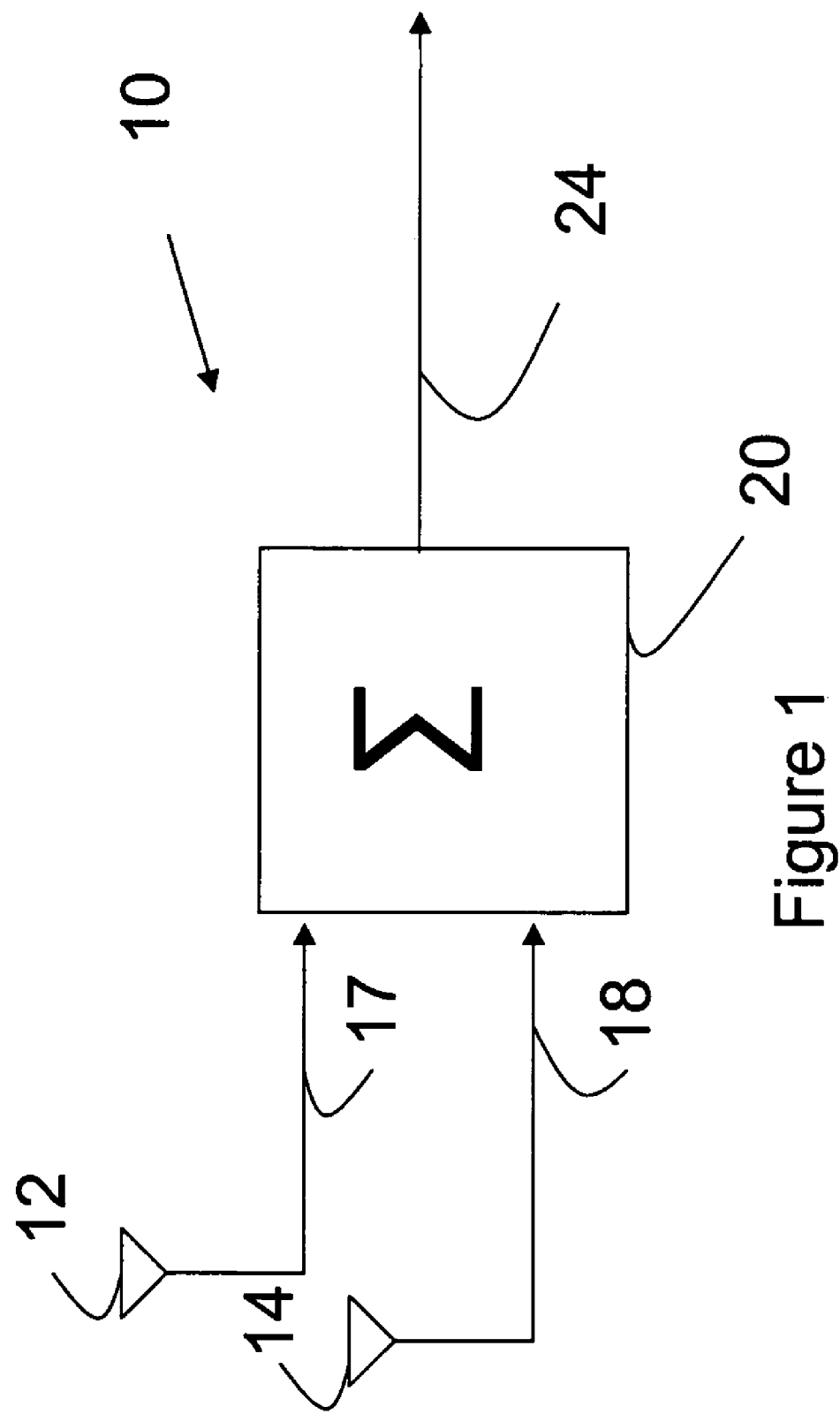
FIG. 1 is a general block diagram showing a front end of a communication system including a first antenna, a second antenna and a combiner in accordance with an exemplary embodiment.
Figure 2:
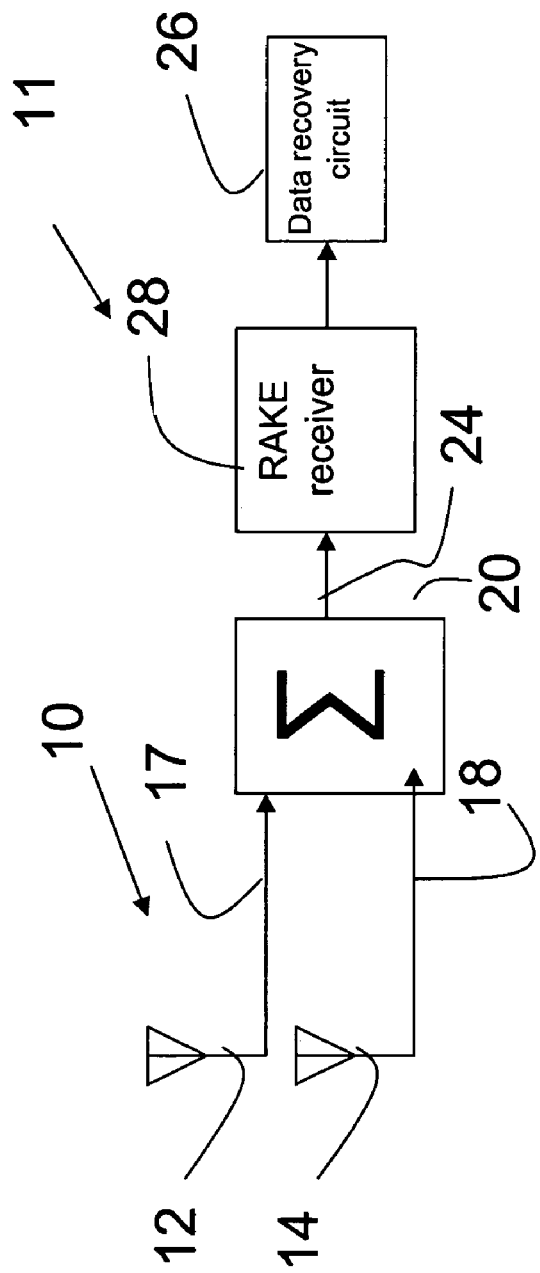
FIG. 2 is a general block diagram of a Link 16 communication system including a first antenna, a second antenna, a combiner, a single receiver, and a data recovery circuit in accordance with another exemplary embodiment.

With reference to FIGS. 1 and 2, a front end 10 of a communication system 11 (FIG. 2) includes an antenna 12 and an antenna 14. Antenna 12 and antenna 14 are preferably coupled to a summer circuit or combiner 20. Combiner 20 receives a signal received on antenna 12 at an input 17 and receives a signal received on antenna 14 at an input 18.

Combiner 20 provides a composite or combined signal (a signal in a multi-path environment) at an output 24. Although two inputs are shown (inputs 17 and 18), combiner 20 can receive signals from more than two antennas and can have a corresponding number of inputs. Combiner 20 can be implemented in a variety of forms without departing from the scope of the invention.

Antennas 12 and 14 can be disposed on a variety of platforms. Preferably, antennas 12 and 14 are provided on a vehicular platform such as an aircraft. In one preferred embodiment, antenna 12 is provided on an upper portion of an aircraft and antenna 14 is provided on a lower portion of an aircraft. In another embodiment, antenna 12 is disposed above a wing and antenna 14 is disposed below a wing.

Front end 10 preferably is part of a Link 16 secured network or other Link 16 communication system. Signals received on antennas 12 and 14 are preferably Link 16 waveforms including along sequence of "chips" or symbols that are pseudo-random. Generally, the waveform includes a synchronization pulse followed by data. Alternatively, system 10 can be any type of spread spectrum communication system, whether vehicle deployed or not.

Preferably, front end 10 is part of a receiving system or receiver 11 (FIG. 2). Receiver 11 is preferably employed in a Link 16 wireless network or a spread spectrum tactical data link. Receiver 11 can receive tactical, positioning, and navigational information in an encrypted format or non-encrypted format. Although use in a Link 16 network is preferred, receiver 11 can be utilized in various other types of wireless communication systems.

With reference to FIG. 2, receiver 11 can be utilized on a land-based platform, a space-based platform, a naval-based platform, or an air-base platform. Receiver 11 includes front end system 10, a rake receiver 28 and a data recovery circuit 26.

Figure 3:
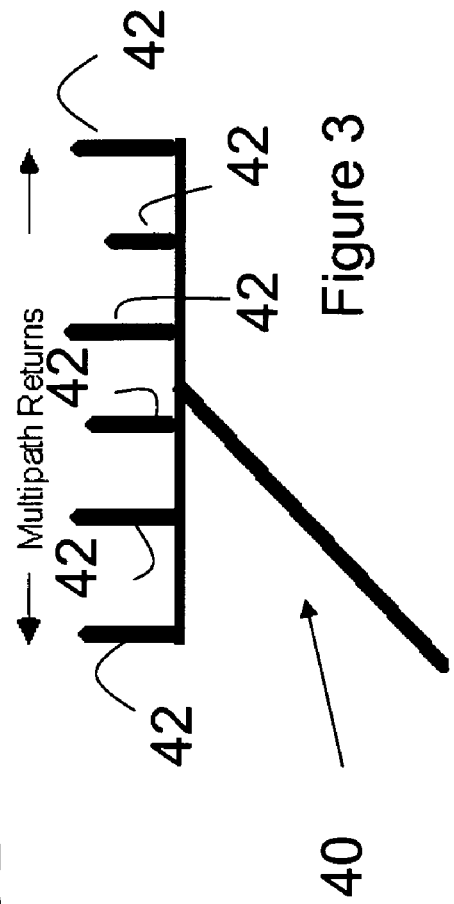
FIG. 3 is a representation of a multi-path signal provided by the combiner in the Link 16 communication system illustrated in FIG. 2 in accordance with another exemplary embodiment.

Rake receiver 28 receives a composite signal at output 24 of combiner 20 and provides information derived from the signal at input 17 and 18 to data recovery circuit 26. Rake receiver 28 is preferably a rake receiver utilizing wide band reception according to technique developed by Price and Green. Rake receiver 28 receives a wide band signal over a multi-path channel (such as at output 24 of combiner 20). The wide band signal preferably includes multi-path returns 42 as schematically represented in FIG. 3 as signal 40.

Rake receiver 28 advantageously utilizes digital processing to take advantage of the multiple antennas (antennas 12 and 14) that are connected to combiner 20. Rake receiver 28 processes the single signal on the multi-path while utilizing only one receiver channel. Receiver 28 can select the best signal path from the multi-path.

In one embodiment, rake receiver 28 is receiving a Link 16 signal-in-space waveform that advantageously allows direct sequence spreading gain of each transmitted burst. This quality of the waveform enables synchronization recovery in severe multi-path environments. Advantageously, system 11 models antennas 12 and 14 as one antenna receiving a single signal in a multi-path environment, thereby taking advantage of the fact that the Link 16 waveform synchronization preamble utilizes a long sequence of "chips" or symbols that are pseudo-random and have significant direct sequence processing gain. Therefore, the use of rake receiver 28 provides two significant advantages in the Link 16 environment: 1. the possibility of increased performance due to diversity reception, 2. the elimination of the need for duplicate receivers and receiving circuitry. Increased performance due to diversity reception is due to diversity gain.

Receiver 11 advantageously uses the fact that spread spectrum signals are both displaced in time and present the same total noise power. In one embodiment, antennas 12 and 14 are each hemispherical elements. In this embodiment, Applicant believes that although the power of the composite signal at output 24 is the same, its content is the summation of two different noise sources originating from upper and lower hemisphere elements (antennas 12 and 14). The noise sources have no bearing on the recovery of the signal from the noise. Although another multi-path signal is present in the same channel (in conventional systems there may be only one signal per channel (e.g. due to isolation by a wing), though there is usually two), Applicant believes that the use of a rake receiver such as receiver 28 makes this a virtue, not a detriment even though in a conventional receiver this would cause degradation.

Applicant is using the principles of combining two antennas into a phased array. In normal operation, an analog gain of 3 dB of signal can be achieved due to collecting the same power signal twice but with half the noise from each hemispherical element according to a preferred embodiment.

Figure 4:
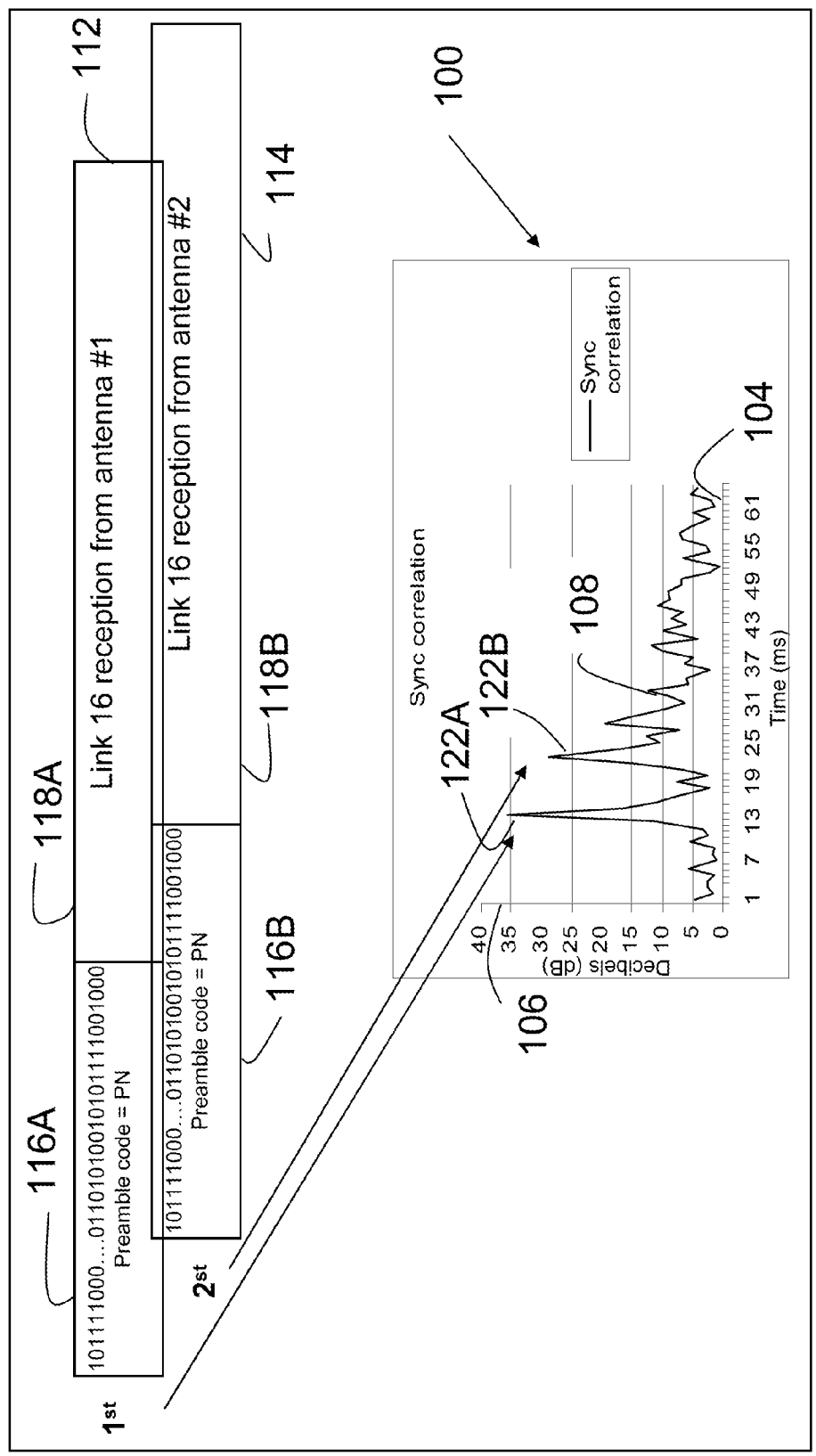
FIG. 4 is a block diagram representation and graph showing the signal received by the single receiver illustrated in FIG. 2.

With reference to FIGS. 2 and 4, operation of receiver 11 is described below. A signal 112 received on antenna 12 is delayed with respect to a signal 114 received on antenna 14. This delay can be accomplished by circuitry between antenna 14 and input 18, circuitry between antenna 12 and input 17, by the placement of antennas 12 and 14 on the platform, by the position of the platform, or by other methods.

Signals 112 and 114 are preferably derived from a Link 16 signal in space. Each of the signals 112 and 114 includes a synchronization code or a preamble code 116A-B and a data portion 118A-B respectively. Data portions 118A-B follow preamble codes 116A-B, respectively.

Signals 112 and 114 are summed by summer 20 and provided at output 24 as a signal 108 (shown on a graph 100 in FIG. 4). Rake receiver 28 correlates the composite signal at output 24 to receive information associated with portions 118A-B.

This technique provides significant operational advantages in certain embodiments. For example, receiver 11 including front end 10 can be employed on an aircraft with antennas 17 and 18 disposed on upper and lower surfaces of the aircraft's wings. In this example configuration, a strong signal is received on one of antennas 17 and 18 and a weak signal is received on the other of antennas 17 and 18 when the aircraft is banked. In this exemplary situation, receiver 11 receives both signals and obtains processing gain by taking the benefit of receiving the signal on both antennas 17 and 18.

Rake receiver 28 determines the delay between signals 112 and 114 and delays the signal that is received first in time (signal 112) and adjusts phase digitally so that both signals are aligned in both phase and frequency to obtain processing gain. Combining the signals digitally obtains superior noise performance.

With reference to FIG. 4, graph 100 represents the composite signal by line 108. Graph 100 includes a Y axis 106 representative of magnitude in decibels (dB) and an X axis 104 representative of time in milliseconds (ms).

A synch pulse 122A for signal 112 and a synch pulse 122B for signal 114 are received and shown on graph 108. Synch pulses 122A-B are utilized to determine the time delay between signals 112 and 114. Data is collected on both signals 112 and 114 at the appropriate time. Preferably, data collection is performed in rake receiver 28.

Rake receiver 28 preferably synchronizes signals 112 and 114 and adds data portions 118A-B together to obtain the data. The data can be provided to data recovery circuit 26 for further processing. Recovery circuit 26 can provide the data to various computer and/or communication equipment or systems.

Antennas 14 and 12 can be a variety of type of antennas. Antennas 12 and 14 are preferably hemispherical antennas. Antennas 12 and 14 are preferably coupled by feed lines such as 75 ohm feed lines that are attached to a T combiner and connect to a 50 ohm coaxial cable.

Combiner 20 can be a passive combiner or an active circuit that sums the signals on inputs 17 and 18 in an analog fashion. In one embodiment, combiner 20 can be a hybrid combiner, a Wilkinson combiner, or other type.

Rake receiver 28 is preferably two receivers for processing two frequencies simultaneously. Receiver 28 preferably has one large correlator. Rake receiver 28 can preferably be one or more field programmable devices or field programmable gate arrays (FPGA). The FPGAs can be programmed in VHDL code. Alternatively, receiver 24 can be implemented as a digital signal processor or other programmable electronic device.

Data recovery circuit 26 is preferably a programmable controller or other logic device including memory storage. Circuit 26 can provide data translation capabilities to place data provided by receiver 24 into predetermined forms.

It is understood that, while preferred embodiments, examples, materials, and values are given, they are for the purpose of illustration only. The apparatus and method of the invention are not limited to the precise details and conditions disclosed. For example, although Link 16 terminals are utilized, other types of wireless networks could be utilized. Thus, changes may be made to the details disclosed without departing from the spirit of the invention, which is defined by the following claims.

What is claimed is:

1. A Link 16 radio system for use in an aircraft, comprising:
    a first hemispherical antenna element for disposition on an upper portion of the aircraft;
    a second hemispherical antenna element for disposition on a lower portion of the aircraft;
    a combiner coupled to the first hemispherical antenna element and the second hemispherical antenna element, the combiner configured to receive a first Link 16 signal from the first hemispherical antenna element and a second Link 16 signal from the second hemispherical antenna element, the combiner providing a combined signal based on the first Link 16 signal and the second Link 16 signal, the first Link 16 signal being delayed with respect to the second Link 16 signal; and
    a rake receiver configured to receive the combined signal from the combiner and identify a strongest signal, wherein the strongest signal is one of the first Link 16 signal and the second Link 16 signal wherein an analog gain of 3 dB can be achieved due to collecting the first Link 16 signal and the second Link 16 signal but with half the noise from each of the first and second hemispherical antenna elements.

2. The Link 16 radio system of claim 1, wherein the rake receiver is implemented in a digital signal processor operating software.

3. The Link 16 radio system of claim 1, wherein the combiner is a passive combiner.

4. The Link 16 radio system of claim 1, wherein the combiner is an active combiner.

5. The Link 16 radio system of claim 1, wherein the combiner is a Wilkinson combiner.

6. The Link 16 radio system of claim 1, wherein the first and second hemispherical antenna elements are coupled by 75 ohm feedlines.

7. The Link 16 radio system of claim 1, wherein the first Link 16 signal and second Link 16 signal received are displaced in time with respect to each other due to the placement of the first and second hemispherical antenna elements.

8. A method of receiving information in a Link 16 system disposed on an aircraft, the method comprising:
    receiving a first Link 16 signal at a first hemispherical antenna element disposed on a first surface of the aircraft;
    receiving a second Link 16 signal at a second hemispherical antenna element disposed on a second surface of the aircraft opposite the first surface;
    providing the first Link 16 signal and the second Link 16 signal in a multipath environment to a rake receiver the first Link 16 signal being delayed and with respect to the second Link 16 signal; and
    recovering the information from the first Link 16 signal and the second Link 16 signal, wherein an analog gain of 3 dB can be achieved due to collecting the first Link 16 signal and the second Link 16 signal but with half the noise from each of the first and second hemispherical antenna elements.

9. The method of claim 8, wherein the first antenna is disposed on a top of the aircraft and the second antenna is disposed on a bottom of the aircraft.

10. The method of claim 8, wherein the first Link 16 signal and the second Link 16 signal are spread spectrum signals.

11. The method of claim 8, wherein the first Link 16 signal is correlated with the second Link 16 signal and added using the rake receiver.

12. The method of claim 11, wherein the rake receiver is implemented on a programmable logic device.

13. The method of claim 12, wherein the first Link 16 signal and the second Link 16 signal is a direct spread spectrum signal.

14. The method of claim 8, wherein the first hemispheric antenna element is disposed on a top surface of the aircraft.

15. A communication system for an aircraft comprising:
    a first hemispherical antenna element disposed on the aircraft;
    a second hemispherical antenna element disposed on the aircraft; and
    means for receiving a single signal derived from a first Link 16 signal received on the first antenna and a second Link 16 signal received on the second antenna, wherein the first Link 16 signal and the second Link 16 signal are delayed with respect to each other due to the placement of the first hemispherical antenna element with respect to the second hemispherical antenna element, the means for receiving correlating a first event associated with the first Link 16 signal received on the first antenna and a second event associated with the second Link 16 signal received on the second antenna, wherein an analog gain of 3 dB can be achieved due to collecting the first Link 16 signal and the second Link 16 signal but with half the noise from each of the first and second hemispherical antenna elements.

16. The communication system of claim 15, wherein the means for receiving is a programmable gate array.

17. The communication system of claim 15 further comprising:
    means for communicating radio signals, wherein the means for receiving comprises a first means for receiving, wherein the means for communicating is configured to communicate signals to a second means for receiving, wherein the means for communicating communicates selected data from the first means for receiving to the second means for receiving.

18. The communication system of claim 16, wherein the means for receiving operates from a platform under Unites States government control.

19. The communication system of claim 18, wherein the means for receiving is programmed in VHDL code.

20. The communication system of claim 15, wherein the means for receiving includes a data collection means that adds data after the first event to data after the second event.

\* \* \* \* \*